Feb. 17, 1948. C. H. FAY 2,436,039

MAGNETIC FIELD GRADIENT MEASUREMENT

Filed Jan. 11, 1945

Inventor: Charles H. Fay
By his Attorney:

Patented Feb. 17, 1948

2,436,039

UNITED STATES PATENT OFFICE 2,436,039

MAGNETIC FIELD GRADIENT MEASUREMENT

Charles H. Fay, Houston, Tex., assignor to Shell Development Company, San Francisco, Calif., a corporation of Delaware Application January 11, 1945, Serial No. 572,279

2 Claims. (Cl. 175—183)

1

This invention pertains to the art of magnetic exploration, and relates more specifically to methods and instruments for the measurement of magnetic field gradients. Such measurements are useful in geophysical exploration, and are of especial value in detecting or locating bodies or objects whose presence underground causes anomalies or disturbances in the magnetic field.

In my copending application Ser. No. 514,581, filed December 15, 1943, now Patent No. 2,425,180, of which the present application is a continuation in part, I have disclosed a device for measuring magnetic fields, said device comprising a vibrator coil, a light train and photocell system adapted to translate the oscillation of the coil into a voltage varying in sympathy therewith, an amplifier for said voltage provided with manual or automatic gain control means, said amplifier driving said coil so that the whole system operates as a feedback oscillator when the coil is properly oriented with respect to the magnetic field component to be measured, the amplification gain required to allow oscillation being inversely proportional to said magnetic field component, and thus serving as a measure of said component when properly calibrated.

While said device is extremely useful for determining the location of underground bodies from surface measurements, such determination is not always possible because of the presence on or near the surface of the ground of other magnetic objects which it may be difficult or impossible to remove. In such cases, however, and especially when the general area under which the buried body lies is known, it is possible to locate said body accurately by means of magnetic measurements carried out in boreholes which may have already been drilled in the vicinity, or may be drilled for the purposes of said measurements, for example, such holes as can conveniently and rapidly be drilled at various points by means of a hand or power operated auger.

While the instrument disclosed in said copending application may be readily constructed in a form adapted for use in a borehole, it is the object of the present invention to provide a method and apparatus especially suitable for such purpose. Nothing in this application, however, is intended to restrict the use of said instrument to measurements in boreholes.

Other objects of the present invention and the manner of operation thereof will be understood from the following description taken with reference to the attached drawing, wherein.

Figures 1, 2:
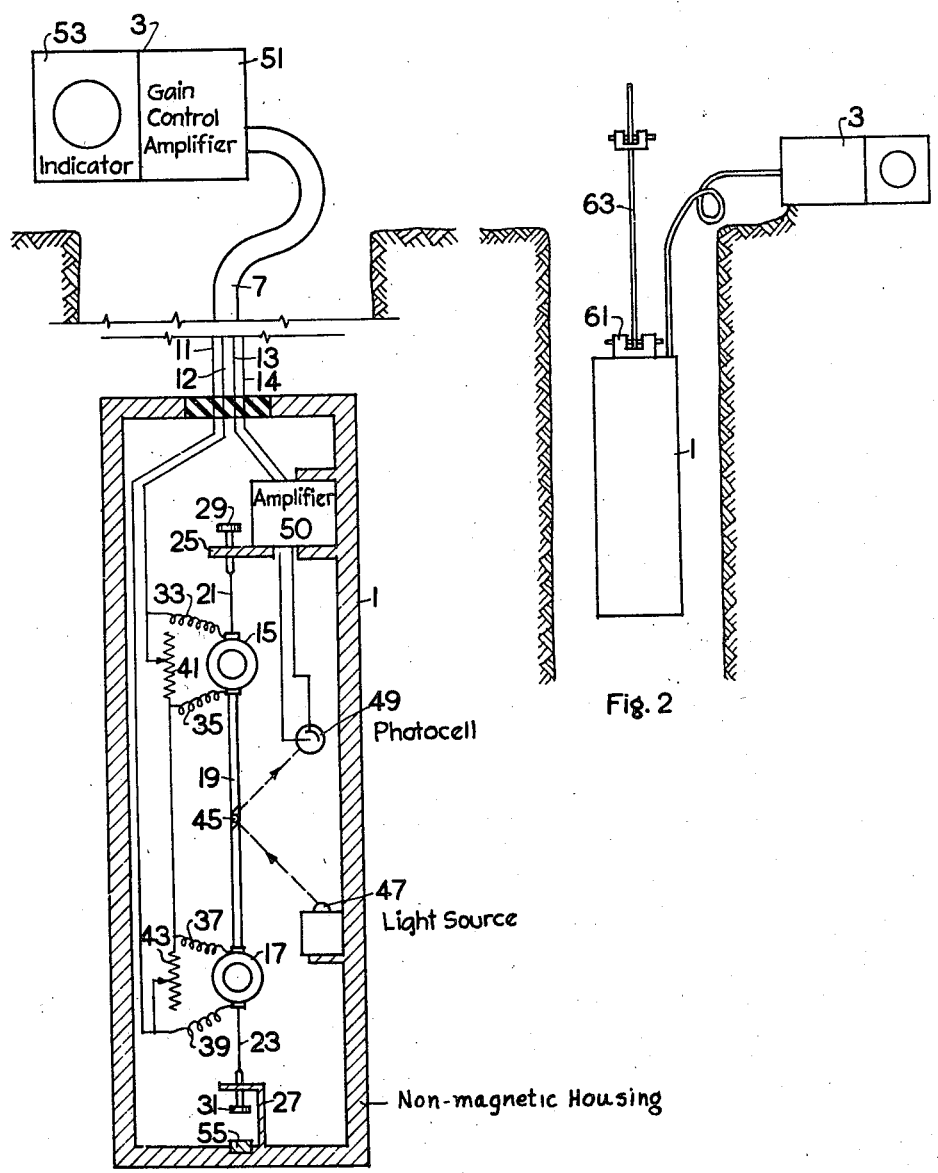
Figure 1 is a diagrammatic view, partly in cross-section, showing the apparatus of the present invention.
Figure 2 shows the device of Figure 1 being lowered into a well by means of rigid rods.

Referring to the drawing, a housing 1, made of 2 a non-magnetic material, is electrically connected to the surface apparatus, generally indicated at 3, by means of an insulated cable 7, comprising a desired number of electrical conductors, of which four—11, 12, 13 and 14—are shown for purposes of illustration.

The housing 1 contains the gradient-sensitive element of the present invention, which comprises coils 15 and 17, each having a desired number of turns of wire, said coils being rigidly held together by a rod or staff 19, which is made, as all parts forming the structure of housing 1, of a non-magnetic material. The coils 15 and 17 are mechanically suspended but not electrically connected, by means of taut wires or filaments 21 and 23, from brackets 25 and 27, suitably arranged within the housing. Means such as screw-threaded knobs 29 and 31 are provided to adjust the tension of the suspensions 21 and 23, and to impart, when desired, a twisting moment to said suspensions. Coils 15 and 17 are connected, by means of conductors 33, 35, 37 and 39, across variable resistances 41 and 43 in the circuit of cable conductors 11 and 12. Coil 15 is connected in series opposition to coil 17, and the coils are made, with regard to size, number of turns, turn area, etc., as nearly alike as possible, so that in the ideal case where the coils are co-planar and identical with each other, the net torque due to a current passing through said coils when the system is suspended in a uniform magnetic field will be zero. Assuming the system to be made so as to have the coils as co-planar as possible, the final angular adjustment can be made by applying a small twist to the system by means of knobs 29 and 31. Inequality in turn area can be compensated for by regulating the ratio of the currents in the two coils by suitable adjustment of the values of the variable shunt resistors 41 and 43.

A small mirror 45 is rigidly attached to some part of the suspended coil system, for example to the rod 19, and is adapted to reflect a beam of light from a source 47, suitably held within the housing 1, to a photocell 49, electrically connected through a pre-amplifier 50, to the conductors 13 and 14.

The operation of the device of the present invention is based on the same principle as that of the devices of my copending application identified hereinabove, which principle may be briefly described as follows.

An oscillation of the suspended coil system about its vertical axis causes the mirror to modify the degree of illumination of the photocell by the reflected beam, whereby the current flowing in the circuit thereof is varied in sympathy with said oscillation. This current is first amplified in pre-amplifier 50, and then in a manual or automatic gain control amplifier at the surface, which amplifier may be provided with an amplification gain indicator 53, circuits suitable for use in said amplifier and indicator being fully disclosed in my aforesaid copending application. The magnetic field due to this amplified current, when passed through coils 16 and 17 by means of conductors 11 and 12, will react with the magnetic field under measurement to develop a torque. Coils 16 and 17 being substantially identical and connected in series opposition, the resulting net torque will be zero under condition of a uniform natural field. When, however, the natural magnetic field has a sensible vertical gradient of its horizontal component, and the suspended system is properly oriented, the torques of the two coils will not cancel each other, the resulting net torque causing the suspended system to oscillate at its own mechanical resonance frequency, the device functioning as a feedback oscillator. The amplification gain which the amplifier 51 must have in order barely to maintain the system in oscillation, which gain is indicated by the properly calibrated device 53, thus serves to measure the magnetic field gradient.

The use of the instrument may be extended to measurement of vertical gradients of the horizontal component of the external field smaller than required to give sufficient feedback for oscillation. This is effected by mounting a small magnet 55 of such strength and in such position in the housing 1 as to provide a gradient slightly larger than that required for oscillation; it is obvious that by turning the instrument about a vertical axis the external gradient can be made to add to or subtract from the internal gradient due to magnet 55, so that the change in reading of indicator 53 upon said turning serves to measure said external gradient, it being assumed that the twisting adjustment and resistor adjustment previously described herein have been made, as can be done by adjusting until the reading of indicator 53 remains substantially constant when the instrument is rotated in a location known to have a gradient of zero value.

In order that the instrument may be operated in a borehole, the housing 1 may be provided with a coupling 61 for rods or tubing, such as shown at 63, said coupling and rods being rigid to prevent rotation about a vertical axis, so that housing can be turned about said axis, and its orientation observed. Any desired number of rods may be coupled together to permit lowering to a desired depth, and the depth can be measured, for example, by marking the rods. In operation measurements are taken at a plurality of depths. At each depth the instrument is rotated until a maximum gradient reading is obtained; this reading and the orientation, that is, the direction of the gradient vector, are recorded.

The location of the buried magnetic body can often be determined from such data for a single borehole, or at least a more favorable location for a second borehole can be chosen from the data, provided, of course, that the first borehole is sufficiently near the object for it to give a measurable magnetic effect. It is obvious that the directional indication obtained with this instrument is of great value; in this regard said instrument is superior for borehole survey to an instrument measuring the vertical gradient of the vertical field.

Another application of the present invention is in the measurement of currents in pipe lines, wires, and the like by their magnetic effects. The magnetic field due to a current in a pipe line, for example, as observed directly over the pipe line, has a horizontal component, and a vertical gradient of that component, at right angles to the direction of the pipe line, so that the present invention can be used to measure said gradient, from which, and the distance from the instrument to the pipe line, the current in said line can be computed. Although it has been known to effect the measurement of pipe line currents by their magnetic effects the instruments used therefor normally afford no means for distinguishing between the field due to the current in the pipe line and the field due to accidental magnetization of the pipe line itself. However, this latter magnetization has usually a negligible horizontal component in the direction at right angles to the pipe above the pipe, and hence a negligible effect on the measurement of the vertical gradient of horizontal field in said direction by means of the device of the present invention.

I claim as my invention:

1. In a system for measuring the gradient of a magnetic field, a unit comprising two spaced coils and means rigidly pivoting said coils in fixed relationship to each other for oscillation about a common axis, means electrically connecting said coils in series opposition, a light source, photo-electric means, optical means carried by said rigid unit for varying the illumination of the photo-electric element by the light source proportionally to the oscillation of said unit, a circuit comprising variable gain ratio amplifier means energized by the output of said photo-electric element, means for passing the output current of said circuit through said coils, means for adjusting the relative intensity of the current passing through each coil, and indicator means in said circuit for indicating the amplification gain of said amplifier means necessary for maintaining said coil unit barely in oscillation by the torque developed by the reaction of the current passing through said coils with the magnetic field in which said rigid unit is oscillating, when said field has a gradient along the oscillation axis of said coils.

2. The system of claim 1, having means for adjusting the angular position of said coils with regard to each other.

CHARLES H. FAY.

REFERENCES CITED

The following references are of record in the file of this patent:

UNITED STATES PATENTS

| Number | Name | Date |
|---|---|---|
| 1,831,744 | Laurent | Nov. 10, 1931 |
| 1,863,415 | Rieber | June 14, 1932 |
| 2,054,672 | Edgar | Sept. 15, 1936 |
| 2,123,045 | Hoare | July 5, 1938 |
| 2,151,627 | Vacquier | Mar. 21, 1939 |
| 2,220,788 | Lohman | Nov. 5, 1940 |
| 2,379,716 | Hull | July 3, 1945 |
| 2,407,202 | Vacquier | Sept. 3, 1946 |

FOREIGN PATENTS

| Number | Country | Date |
|---|---|---|
| 397,167 | Great Britain | Aug. 14, 1933 |